(12) United States Patent
Koelle et al.

(10) Patent No.: US 7,937,210 B2
(45) Date of Patent: May 3, 2011

(54) DEVICE FOR CONTROLLING AN INTERNAL COMBUSTION ENGINE

(75) Inventors: Ulrich Koelle, Schwieberdingen (DE); Thorsten Mausbach, Wien (DE); Georgios Daniilidis, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 11/992,468

(22) PCT Filed: Sep. 6, 2006

(86) PCT No.: PCT/EP2006/066067
§ 371 (c)(1),
(2), (4) Date: Jul. 29, 2009

(87) PCT Pub. No.: WO2007/036413
PCT Pub. Date: Apr. 5, 2007

(65) Prior Publication Data
US 2009/0299599 A1 Dec. 3, 2009

(30) Foreign Application Priority Data
Sep. 29, 2005 (DE) .......................... 10 2005 046 656

(51) Int. Cl.
*F02P 5/145* (2006.01)
*F02D 41/22* (2006.01)

(52) U.S. Cl. .................... 701/110; 701/107; 123/198 D; 123/406.58; 73/114.26

(58) Field of Classification Search ............. 123/406.18, 123/406.24, 406.58, 406.6, 406.61, 406.62, 123/406.63, 198 D; 701/103–105, 110; 73/114.26
See application file for complete search history.

(56) References Cited

U.S. PATENT DOCUMENTS

| | | | |
|---|---|---|---|
| 5,647,322 A * | 7/1997 | Fukui et al. | 123/406.18 |
| 5,794,592 A | 8/1998 | Fukui | |
| 6,341,253 B1 * | 1/2002 | Honda | 701/102 |
| 6,367,437 B2 * | 4/2002 | Nakamura et al. | 123/90.17 |
| 6,745,748 B2 * | 6/2004 | Kobayashi | 123/406.18 |
| 6,775,611 B2 * | 8/2004 | Kobayashi et al. | 701/114 |
| 7,142,973 B2 * | 11/2006 | Ando | 701/112 |
| 2008/0172160 A1 * | 7/2008 | Jiang et al. | 701/51 |

FOREIGN PATENT DOCUMENTS

| | | | |
|---|---|---|---|
| DE | 43 38 106 | | 5/1995 |
| DE | 4418579 | * | 11/1995 |
| DE | 197 30 970 | | 8/1998 |
| EP | 0 708 233 | | 4/1996 |
| FR | 2 829 836 | | 3/2003 |
| KR | 391608 | * | 7/2003 |

* cited by examiner

*Primary Examiner* — Hai H Huynh
(74) *Attorney, Agent, or Firm* — Kenyon & Kenyon LLP

(57) ABSTRACT

A device for controlling an internal combustion engine has sensors That measure the operating states of the internal combustion engine. The sensor signals are used for determining control signals for the internal combustion engine. Furthermore, testing means are provided which verify the sensor signals and if implausible sensor signals are detected, control of the internal combustion engine is prevented.

7 Claims, 2 Drawing Sheets

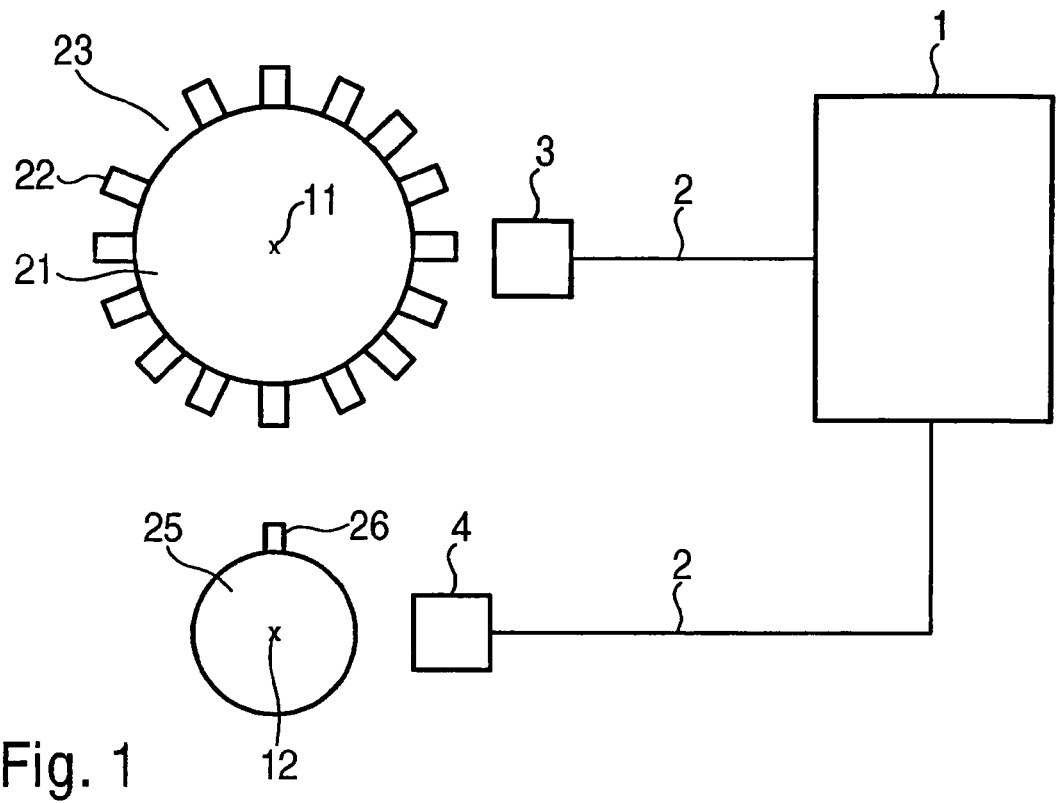
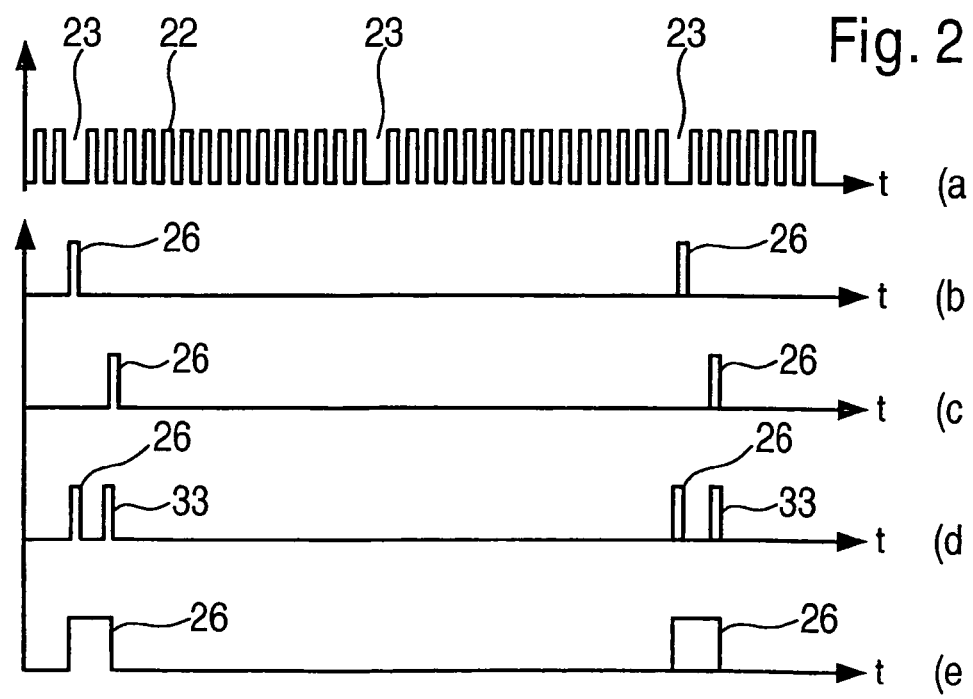

US 7,937,210 B2

DEVICE FOR CONTROLLING AN INTERNAL COMBUSTION ENGINE

RELATED APPLICATION INFORMATION

The present application is a United States national phase patent application and claims the benefit of and priority to International Application No. PCT/EP2006/066067, which was filed Sep. 6, 2006, and which claims the benefit of and priority to German Patent Application No. 10 2005 046656.7, which was filed in Germany on Sep. 29, 2005, both of which are incorporated by reference.

FIELD OF THE INVENTION

The present invention is directed to a device for controlling an internal combustion engine according to the definition of the species in the independent patent claim.

BACKGROUND INFORMATION

Devices for controlling internal combustion engines are already known, in which sensor signals that measure the operating states of the internal combustion engine are analyzed. The sensor signals measured in this manner are used to determine control signals for controlling the internal combustion engine.

Control units in which theft protection is provided for preventing theft of a motor vehicle by exchanging an engine control unit are also already known. However, control units of identical design are used in various vehicles, some of which have no theft protection.

SUMMARY OF THE INVENTION

The device of the present invention having the features of the independent patent claim has the advantage that the control unit and sensors of the relevant internal combustion engine are interlinked via simple means. This makes it possible to prevent an engine control unit from a vehicle without theft protection from being exchanged for an engine control unit of a vehicle with theft protection.

Additional advantageous embodiments result from the features of the dependent patent claims. The control device may be designed in a particularly simple manner if the verification is based on properties of the sensor signals that are of no significance for determining the control signals. The same software for determining the control signals may be used for different types of devices for controlling an internal combustion engine. It is particularly appropriate to evaluate signals of the crankshaft angle sensors or camshaft angle sensors, since these sensors contain signals of corresponding sensor discs that are connected to the corresponding shafts. These sensor discs in an internal combustion engine are only able to be replaced with considerable effort.

A simple possibility for ensuring the verifiability of the sensor signals between different control units is a specified angular distance between the signals of the crankshaft and camshaft. Another simple possibility for verifying the plausibility of the sensor signals is to mark a second position on the sensor wheel for the camshaft angle sensor, which is then verified. The thus measured signals of the crankshaft angle sensors and/or the camshaft angle sensors may be verified even further by detecting a compression event in the cylinders of the internal combustion engine and evaluating the relative position of the compression event and signals of the crankshaft angle sensor or camshaft angle sensor. In particular in a starting phase of the internal combustion engine, it is thus possible to detect if an attempt is made to simulate these signals by an external intervention.

Exemplary embodiments of the present invention are depicted in the drawings and explained in greater detail in the following description.

BRIEF DESCRIPTION OF THE DRAWINGS

FIG. 1 shows a device for controlling an internal combustion engine which evaluates the signals of a crankshaft angle sensor and a camshaft angle sensor.

FIG. 2 shows signals of the crankshaft angle sensor and camshaft angle sensor.

DETAILED DESCRIPTION

Figure 3:
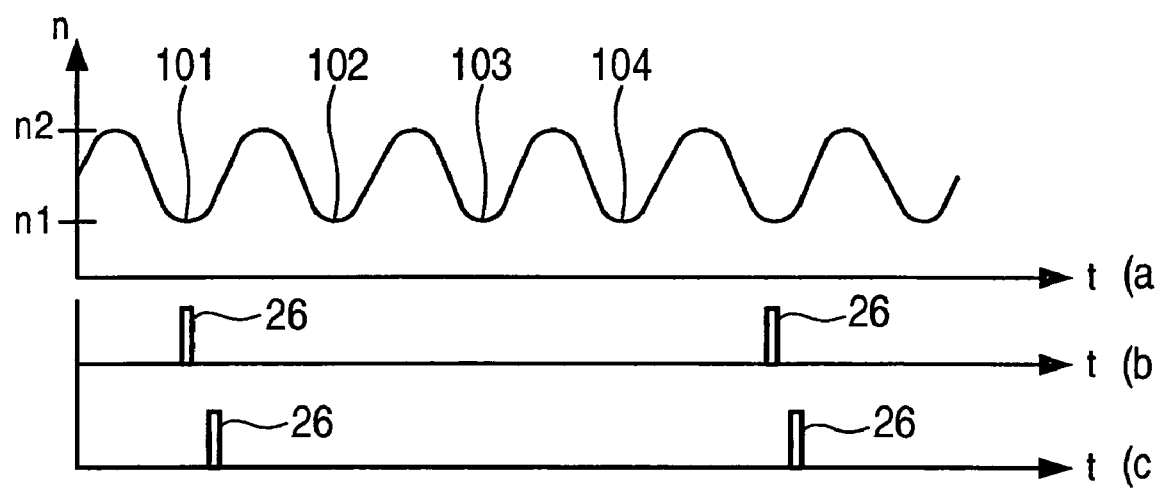
FIG. 3 shows a rotational speed curve and signals of a camshaft angle sensor of an internal combustion engine.

FIG. 1 shows a schematic representation of a device 1 for controlling an internal combustion engine which is connected to sensors 3 and 4 via connecting leads 2. Only crankshaft 11 and camshaft 12 of the internal combustion engine itself are shown schematically in FIG. 1. The additional components of the internal combustion engine are immaterial for the description of the exemplary embodiments and/or exemplary methods of the present invention and are therefore not shown in greater detail in FIG. 1. The engines are conventional gasoline or diesel four-cycle engines such as those adequately known to those skilled in the art. A crankshaft sensor wheel 21, having a plurality of teeth 22 is connected to crankshaft 11.

These teeth are equally spaced around the entire circumference of sensor wheel 21, a tooth 22 not being present at one point so that a gap 23 is formed there. Teeth 22 of sensor wheel 21 move past sensor 3. Each time a tooth 22 passes sensor 3, a pulse is generated in sensor 3 which is emitted to control device 1 via line 2. By evaluating these pulses, control unit 1 is able to infer the movement of crankshaft 11. Camshaft 12 has a camshaft sensor disc 25 to which a mark 26 is affixed. When mark 26 brushes past sensor 4, a pulse is generated which is fed to control device 1 via lead 2. This pulse enables control device 1 to infer the rotation of camshaft 12.

Customarily, teeth 23 or mark 26 are made of soft magnetic material and they move past sensors 3, 4, which are designed either as inductive sensors or Hall effect sensors. Corresponding pulses which are supplied to control device 1 via leads 2 are thus generated. Sensor discs 21 and 25 are fixedly joined to the particular shafts, i.e., crankshaft 11 and camshaft 12. The position of gap 23 and mark 26 indicates a fixedly set angle of crankshaft 11 and camshaft 12, respectively. This information therefore informs control device 1 of the position assumed by the cylinders of the internal combustion engine when brushing past gap 23 or mark 26.

The signal of sensor 3, i.e., of the crankshaft angle sensor, is plotted against time t on curve A in FIG. 2. The signal of sensor 4, i.e., of the camshaft angle sensor, is plotted against time on curve B. In a similar manner, the curves may also be plotted against the angle of rotation of the internal combustion engine. As can be seen in curve A, the signal of sensor 3 is made up of a sequence of pulses having identical spacing from one another in FIG. 2a. This is the case when the internal combustion engine rotates at a constant speed. The absence of a signal caused by gap 23 is clearly evident. This gap is also denoted by reference numeral 23 and the pulses of teeth 22 are denoted by reference symbol 22 in curve A. Crankshaft 11 rotates twice as fast as camshaft 12 so that it can be seen in curve B that the pulse of mark 26 occurs only at the time each second gap 23 occurs. Camshaft sensor discs 21 and 25 are designed and affixed to the corresponding shafts in such a way that the signal of mark 26 in camshaft angle sensor 4 occurs exactly at the time a signal is absent in crankshaft angle sensor 3 due to gap 23.

The control of the internal combustion engine is now essentially based on the signal of curve A, since very exact rotational speed information is present there. Due to the doubled rotational speed of the crankshaft, however, it is not possible to judge from the signal of curve A which working cycle the particular cylinder is in. For this purpose, when gap 23 occurs, a check is performed to determine whether the signal of mark 26 is present. However, it is of no significance for the detection of the relevant working cycle of the internal combustion engine whether mark 26 coincides exactly with gap 23 or whether this signal appears offset by one or two teeth relative to gap 23. Such an alternative signal curve, which is based on correspondingly changed positioning of mark 26 on sensor disc 25, is shown in FIG. 2c. As can be readily seen, the appearance of mark 26 relative to gap 23 is offset by two teeth 22 in FIG. 2c. This is irrelevant for the purpose of control, since only the information concerning the working cycle to which gap 23 must be assigned in the crankshaft signal of curve A is needed. In the case of curve C, it is not checked during gap 23 if mark 26 has appeared in gap 23 or instead two teeth 22 after gap 23.

The information as to whether mark 26 appears during gap 23 or is offset to an earlier or later point in time may, however, be used to differentiate between internal combustion engines of different manufacturers and in particular to prevent an exchange of control units between combustion engines of different types or vehicle manufacturers. This is useful in particular when control units having identical functionality are sold for the control of internal combustion engines having varying complexity of theft protection. A control unit which is equipped with a relatively high level of theft protection complexity is used in vehicle type A. In such a vehicle, it is particularly difficult for a thief to start the engine. In vehicle type B, a control unit having the same range of functions is used and it also uses the same sensor signals. However, no theft protection is used in vehicle type B. The theft protection of vehicle A could be overcome by removing the control unit with theft protection and replacing it with the control unit of vehicle B without theft protection. The exemplary embodiments and/or exemplary methods of the present invention eliminates this problem by using somewhat modified sensor signals in vehicle type B and having the control unit of vehicle B perform an additional verification of the sensor signals. If implausible sensor signals which do not correspond to the modification of the sensor signals compared to vehicle type A are detected during this verification, the control unit prevents the control of the internal combustion engine in that the corresponding control signals are not determined for controlling the internal combustion engine.

In principle, the device of the present invention is capable of working with any type of sensor signals to perform a verification to determine whether the sensor signals match the corresponding control unit for the relevant internal combustion engine. Sensors, however, may be used that are not easily exchangeable. The sensors for the crankshaft angle and the camshaft angle are therefore suitable in particular, since these sensors require a corresponding sensor wheel disc which is fixedly joined to crankshaft 11 and camshaft 12. It is only possible to exchange these sensor discs with great effort, making it particularly difficult to overcome this form of assignment of control unit 1 to the internal combustion engine.

FIGS. 2d and 2e show additional alternative embodiments of marks 26 on a camshaft sensor wheel 25 which may also be used to verify whether the control unit is used for a correspondingly provided internal combustion engine. FIG. 2d shows a signal sequence in a sensor wheel having a mark 26 as in the curve according to FIG. 2b. However, an additional mark 33 which is positioned after mark 26 on the camshaft is provided. A sensor wheel that generates a signal sequence according to FIG. 2b would thus be used for engines of type A. A sensor wheel that generates a signal sequence according to FIG. 2d would be used for combustion engines of type B. Therefore, the same software could be used in vehicle B in order to generate the control signals for activating the internal combustion engine. However, an additional query routine that verifies after mark 26 if a signal corresponding to mark 33 also occurs would be provided. If this signal of mark 33 does not occur, the control unit determines that although it is intended for an internal combustion engine of type B, it is being used for operating an internal combustion engine of type A and it would accordingly stop generating control signals.

FIG. 2e shows another signal sequence of a camshaft sensor wheel 25, mark 26 in this case simply being significantly wider than in the signal curve according to FIG. 2b. Again, the same software could be used as for evaluating the signal sequence according to FIG. 2b, i.e., when gap 23 occurs in the crankshaft signal, it would be determined if a corresponding camshaft signal is present. This would be possible either based on the ascending signal flank of signal 26 or even by a simple level query. To determine if the control unit is used for a type B internal combustion engine, a check is simply made after gap 23 to determine whether the signal level of the camshaft signal is still high. The control unit is thus able to evaluate if it is used for a type A or B internal combustion engine and accordingly stop generating control signals in the case of incorrect use.

An attempt could be made to make it possible to use a control unit for a type B engine in a type A engine by inserting a signal forming circuit between the sensors and the control unit, which based, for example, on the signal curve according to FIG. 2b, generates a signal curve as in FIGS. 2c, 2d or 2e. To prevent this, an additional measure may be provided and will now be explained with reference to FIG. 3. FIG. 3a shows rotational speed n plotted against time t. The state shown in FIG. 3a corresponds to a starting event of the internal combustion engine in which the engine is started by operating a starter at a rotational speed in the order of magnitude of several hundreds of revolutions per minute. Corresponding to the rotation of the engine caused by the starter, corresponding sensor signals are also generated, for example, sensor signals of the camshaft sensor shown in FIG. 3b. When the engine is driven by a starter, the rotational speed is subject to fluctuations resulting from the fact that the rotational resistance of the engine is of varying strength. Whenever one of the cylinders compresses the gas mixture contained therein, as is the case before combustion in four-cylinder engines, a very high force must be applied in order to rotate the engine, which is noticed as a reduction of the rotational speed of the engine driven by the starter. The rotational speed thus fluctuates between a low value n1 and a high value n2. Minimums 101 through 104 of the rotational speed as shown in FIG. 3a thus correspond to the operating points at which a compression event occurs in a cylinder. Analyzing the rotational speed thus makes it possible to determine when a compression event occurs in a cylinder. If the sensor discs are designed in such a way that either mark 26 on the camshaft or gap 23 on the crankshaft has a fixed position relative to the compression events in the cylinders, this rotational speed curve may be used to determine if the engine is of type A or B. To that end, the camshaft signals are plotted in FIGS. 3b and 3c as used already in FIGS. 2b and 2c. The evaluation of the rotational speed signal and comparison with the corresponding camshaft signal thus makes it possible to determine if mark 26 occurs precisely at a minimum of rotational speed or even at a specific offset relative to a rotational speed minimum 100 through 104. Therefore, this evaluation may also be used to verify how mark 26 and camshaft 12 are assigned relative to the cylinders. Control unit 1 is thus able to determine if it is being used for an appropriately provided engine type or another engine type.

The signal curves of the crankshaft signals as described in FIGS. 2b and 2c are shown in FIG. 3. However, it is just as possible to evaluate the signal curves of curves 2d and 2e or even the relative position of gap 23 relative to the rotational speed minimums of curve 3a.

Since the starting phase of the engine is a highly dynamic phase, it is extremely difficult to simulate this signal using a corresponding signal-forming circuit. This method may thus be used as an additional safeguard.

What is claimed is:

1. A device for controlling an internal combustion engine, comprising:
 a determining arrangement to evaluate sensor signals that measure operating states of the internal combustion engine and using them to determine control signals to control the internal combustion engine; and
 a testing arrangement to verify the sensor signals and prevent the control of the internal combustion engine if implausible sensor signals are determined during the verification;
 wherein the verification is performed based on properties of the sensor signals that are of no significance in determining the control signals.

2. The device of claim 1, wherein the testing arrangement evaluates signals of at least one of a crankshaft angle sensor and a camshaft angle sensor.

3. The device of claim 2, wherein the testing arrangement evaluates signals of the crankshaft angle sensor and of the camshaft angle sensor, the signals of the crankshaft angle sensor indicating a position of the crankshaft and the signals of the camshaft angle sensor indicating a position of the camshaft, and wherein an angular distance between the crankshaft and the camshaft is evaluated for the verification.

4. The device of claim 2, wherein the testing arrangement evaluates the signals of the camshaft angle sensor, the signals of the camshaft angle sensor indicating a first position and a second position of the camshaft, and wherein the signals of the camshaft angle sensor at the first and second position are evaluated for the verification.

5. The device of claim 2, wherein when the internal combustion engine is started, a rotational speed signal of the internal combustion engine is evaluated, a compression event in cylinders of the internal combustion engine is detected based on fluctuations of the rotational speed and a relative position of the compression event and signals of at least one of the crankshaft angle sensor and the camshaft angle sensor are evaluated for the verification.

6. A device for controlling an internal combustion engine having a working cycle, comprising:
 a determining arrangement to evaluate sensor signals that measure operating states of the internal combustion engine and using them to determine control signals to control the internal combustion engine, wherein control of the internal combustion engine is based in part on an indication by a particular sensor signal during a particular time period of the working cycle, wherein control of the internal combustion engine is independent of which part of the particular time period the indication is provided;
 a testing arrangement to verify which part of the particular time period the indication is provided in; and
 a disabling arrangement to prevent operation if the part of the particular time period the indication is provided in does not match a preset part of the particular time period associated with the device.

7. The device for controlling an internal combustion engine of claim 6, further comprising:
 a second testing arrangement to verify an offset between the part of the particular time period the indication is provided in and a repeating reference point of an osculating rotation speed of the internal combustion engine, wherein the disabling arrangement also prevents operation if the part of the particular time period the indication is provided in does not match a preset offset associated with the device.

\* \* \* \* \*